US010036567B2

(12) United States Patent
Sauer et al.

(10) Patent No.: US 10,036,567 B2
(45) Date of Patent: Jul. 31, 2018

(54) VENTILATOR HAVING AN ELECTRICAL CONNECTION DEVICE

(71) Applicant: ebm-papst Mulfingen GmbH & Co. KG, Mulfingen (DE)

(72) Inventors: Thomas Sauer, Bad Mergentheim (DE); Dieter Best, Ingelfingen (DE); Sven Beck, Krautheim (DE); Matthias Maschke, Kupferzell (DE); Stephan Nadig, Zweiflingen-Pfahlbach (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 242 days.

(21) Appl. No.: 14/433,477

(22) PCT Filed: Aug. 26, 2013

(86) PCT No.: PCT/EP2013/067614
§ 371 (c)(1),
(2) Date: Apr. 3, 2015

(87) PCT Pub. No.: WO2014/053274
PCT Pub. Date: Apr. 10, 2014

(65) Prior Publication Data
US 2015/0233593 A1   Aug. 20, 2015

(30) Foreign Application Priority Data

Oct. 5, 2012  (DE) ........................ 10 2012 109 478

(51) Int. Cl.
*F24F 11/00* (2018.01)
*F24F 13/10* (2006.01)
*H02G 15/06* (2006.01)

(52) U.S. Cl.
CPC .......... *F24F 11/0001* (2013.01); *F24F 13/10* (2013.01); *H02G 15/06* (2013.01)

(58) Field of Classification Search
CPC ...... F24F 11/0001; F24F 13/10; H02G 15/06; H02G 3/16
(Continued)

(56) References Cited

U.S. PATENT DOCUMENTS 3,909,589 A * 9/1975 Stone ................. F21V 33/0092
                                                         219/220
4,740,167 A   4/1988 Millhimes et al.
(Continued)

FOREIGN PATENT DOCUMENTS

DE   4412870 A1   10/1995
EP   1646118 A2   4/2006
EP   2477291 A1   7/2012

OTHER PUBLICATIONS

International Search Report (in German with English Translation) for PCT/EP2013/067614, dated Mar. 27, 2014; ISA/EP.
(Continued)

*Primary Examiner* — Gregory Huson
*Assistant Examiner* — Dana Tighe
(74) *Attorney, Agent, or Firm* — Harness, Dickey & Pierce, P.L.C.

(57) ABSTRACT

The invention relates to a ventilator, having an electrical ventilator motor and an electrical connection device for connecting electrical motor lines leading to the motor to external electrical connecting lines. The connection device has a terminal box mounted to a device part comprising electrical contact elements, and has an additional connection part, to which the motor lines are connected. The terminal box is releasably connected to the additional connection part via electrical plug-in connections.

10 Claims, 5 Drawing Sheets

(58) Field of Classification Search
USPC .......................................... 454/256; 200/334
See application file for complete search history.

(56) References Cited

U.S. PATENT DOCUMENTS

| | | | |
|---|---|---|---|
| 5,763,827 A | 6/1998 | Sugiura | |
| 6,998,945 B2* | 2/2006 | Huang | H01H 83/04 335/18 |
| 2006/0086521 A1 | 4/2006 | Andresen et al. | |
| 2011/0259720 A1* | 10/2011 | Wu | H01H 23/025 200/317 |
| 2012/0208397 A1 | 8/2012 | Schwarze et al. | |

OTHER PUBLICATIONS

International Preliminary Report on Patentability for PCT/EP2013/067614 with Annex, dated Nov. 26, 2014; ISA/EP.

* cited by examiner

VENTILATOR HAVING AN ELECTRICAL CONNECTION DEVICE

CROSS REFERENCE TO RELATED APPLICATIONS

This application is a U.S. National Phase Application under 35 U.S.C. 371 of International Application No. PCT/EP2013/067614 filed on Aug. 26, 2013 and published in German as WO 2014/053274 A1 on Apr. 10, 2014. This application is based on and claims the benefit of priority from German Application No. 102012109478.0 filed on Oct. 5, 2012. The entire disclosures of all of the above applications are incorporated herein by reference.

The present invention relates to a ventilator comprising an electric ventilator motor and an electrical connection device for connecting electrical motor lines, which lead to the motor, to external electrical connection lines, the connection device comprising a terminal box which is fixed to an appliance part of the ventilator and which contains electrical contact elements.

In known ventilators, a terminal box is generally fixed to a ventilator part, such as a wall ring provided for mounting the ventilator motor together with its ventilator wheel, or on what is known as a diffuser or on another housing part or appliance part, all of the lines to be connected being introduced into the terminal box via feed-throughs and being electrically connected therein. In particular in the event of a fault or repair, the ventilator must be disconnected reliably from the mains power supply. Thus far, an off switch has been necessary for this purpose, so as to be able to disconnect the mains power from the terminals. The terminal box subsequently had to be opened and the line connections subsequently had to be manually disconnected. As a result, this involved considerable effort.

DE 44 12 870 A1 discloses an electrical connection device for a refrigerating and/or freezing appliance that consists of a plug-on unit which can be plugged on connector pins arranged on the outside of a housing encapsulating a motor compressor unit and inside a box open to the outside and connected to the housing. Here, the plug-on unit is provided with terminals for connecting the power supply of the motor and other components to be connected electrically. The connection device further consists of a cover lid which can be attached on the box. According to DE 44 12 870 A1 the plug-on unit is composed of an adapter housing which, on its side opposite to sockets for receiving the connector pins, is provided with plug-in contacts and fixtures for single- or multicontact connectors each having different contours. The fixtures of the connectors are adapted in such a way that each connector can only be inserted into the fixture specifically provided for it and coupled with the associated plug-in contacts. According to the preamble of the description of DE 44 12 870 A1, modern refrigerating and freezing appliances require in addition to the electrical connection for lighting and ventilators further electrical connections for appliance controls. In the connection device disclosed in DE 44 12 870 A1, according to DE 44 12 870 A1 all electrical connections of the refrigerating and/or freezing apparatus are united in the adapter housing which thus serves not only as connection for the appliance cord and the power supply of the compressor motor, but is moreover the central supply unit for the entire electric load of the appliances.

The object of the present invention is to provide a ventilator with a connection device, wherein maintenance and repair works can be carried out more simply, more rapidly and with overall reduced effort whilst maintaining the required safety.

Accordingly, the invention provides that the connection device comprises an additional connection part, to which the motor lines are connected, the terminal box being connected to the additional connection part releasably, and thus separably, via electrical plug-in connections. Moreover, according to the invention the terminal box is releasably fixed to the appliance part by means of external screw connections, the terminal box having an off switch for switching off an external supply voltage. According to the invention, the off switch is in the form of a rotary switch and comprises a lever-like switching knob in such a way that at least one of the external screw connections is covered in an on position and is accessible for release in an off position, or the off switch is in the form of a sliding switch in such a way that at least one of the external screw connections is covered in its on position and is accessible for release in an off position. In a preferred configuration, the connection part is releasably fixed in a region of the appliance part covered by a base of the terminal box. The connection part and the base of the terminal box may advantageously be formed substantially congruent with a similar, in particular rectangular surface profile. The connection part comprises plug-in connector parts directed upwards towards the terminal box, whilst in the region of the base thereof the terminal box comprises corresponding plug-in connector parts directed downwards towards the connection part. Preferably, the plug-in connector parts of the terminal box comprise electrical contact protection insulation.

After the mechanical holding connection thereof is released, the actual terminal box can be separated from the appliance part and thus also from the connection part mounted on the appliance part, specifically whilst simultaneously separating the electrical plug-in connections. The mechanically released terminal box remains connected to the external connection lines. As a result of this simple release and separation of the terminal box, the ventilator motor can thus be maintained or replaced in its entirety together with the pre-wired connection part thereof, without difficulty. After repair or replacement, it merely remains to fix the respective connection part to the appliance again. Subsequently, the terminal box is placed on again and likewise fixed to the appliance. The electrical plug-in connections are automatically connected again. In this way, terminal connection operations are advantageously no longer required, and the terminal box also does not need to be opened at all.

According to the invention the terminal box additionally comprises the off switch, so as to be able to switch off the mains power before actually separating the plug-in connections according to the invention.

In the following, the invention is to be described in greater detail by way of a preferred embodiment, which is illustrated in the drawings, in which.

In the various drawings, like parts are always provided with like reference numerals.

In relation to the following description, it is expressly emphasised that the invention is not limited to the embodiments or to some or all of the features of disclosed feature combinations, but rather each individual sub-feature of the/each embodiment may also take on inventive significance in isolation from all of the other subfeatures disclosed in connection therewith, both in its own right and in combination with any features of another embodiment, and also irrespective of the feature combinations and dependencies of the claims.

Figure 1:
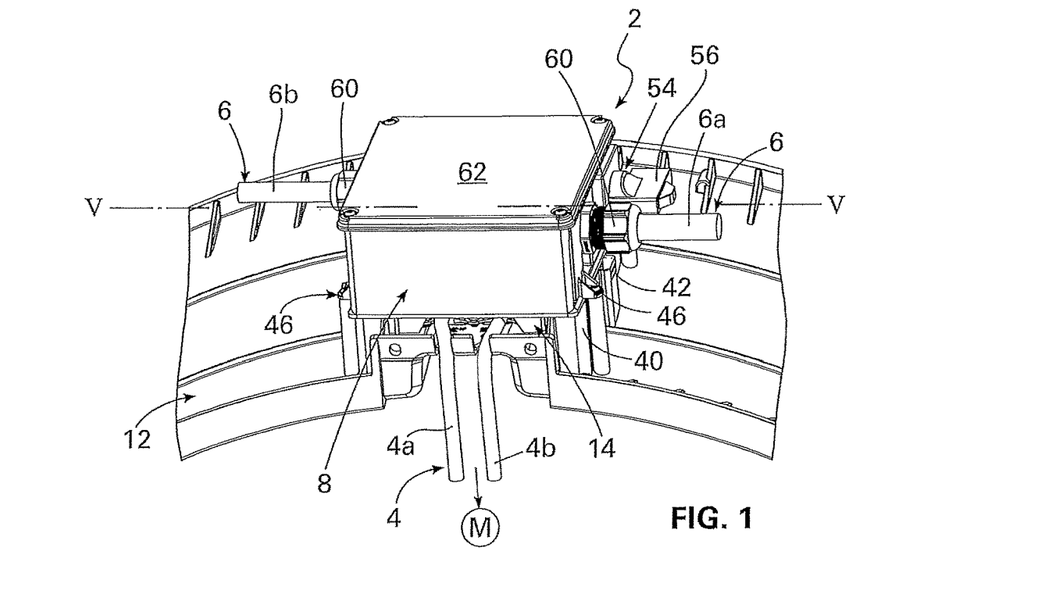
FIG. 1 is a perspective view of the region of a connection device according to the invention in the mounted state.
Figure 2:
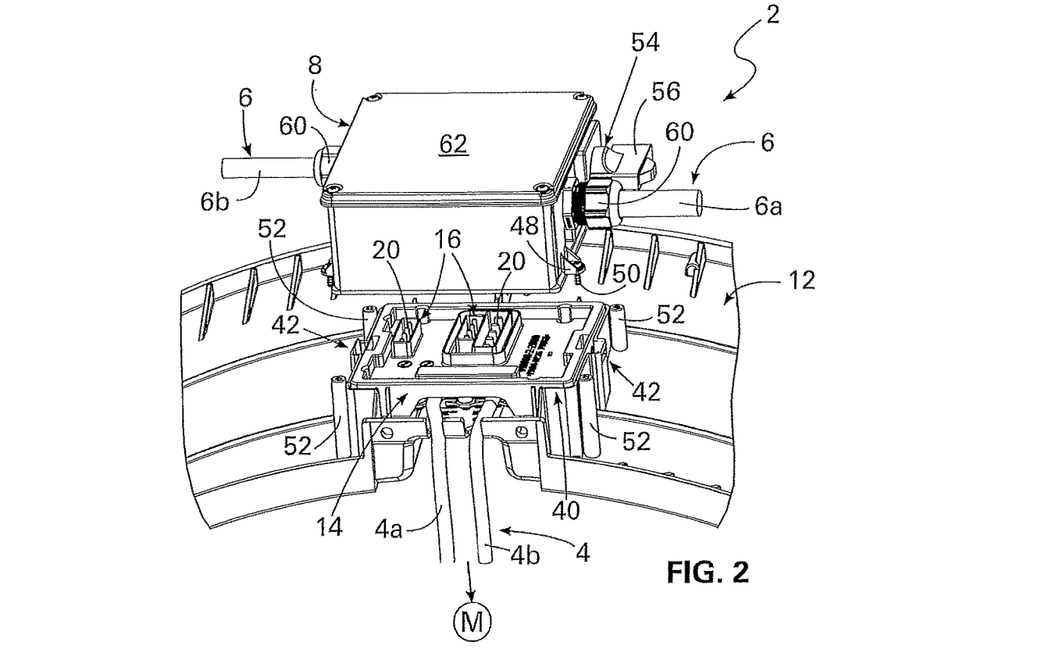
FIG. 2 is a view as in FIG. 1, but with the terminal box disconnected.

Each of the drawings merely shows the region of an electrical connection device 2 of the ventilator according to the invention. The ventilator may be in the form of an axial, radial or diagonal ventilator, an electric motor M, merely illustrated schematically in FIGS. 1 and 2, driving a ventilator wheel (not shown) in rotation.

Figure 5:
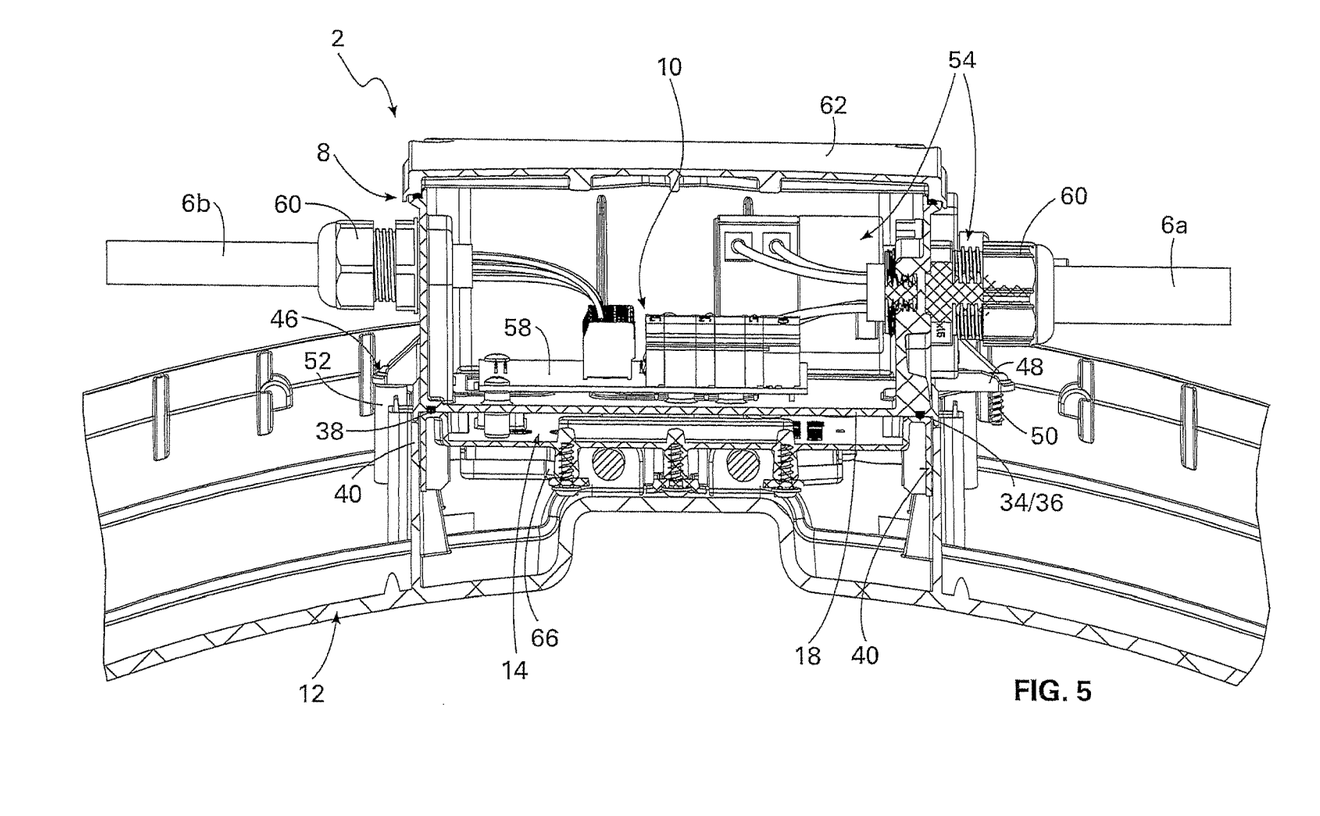
FIG. 5 is a cross section, enlarged by comparison with FIG. 1, in a section plane indicated by a line V-V.

The connection device 2 is used to connect electric motor lines 4, leading to the motor M, to external electrical connection lines 6. For this purpose, the connection device 2 comprises a terminal box 8, which contains electrical contact elements 10 (see FIGS. 3 and 5) and which is fixed to an appliance part 12. In the preferred embodiment shown, the appliance part 12 is what is known as a diffuser for influencing the flow properties of the ventilator. However, the appliance part 12 may also be formed by any other part, for example a wall ring, provided for mechanically mounting the motor M together with its ventilator wheel, or another housing part.

In the example shown, both a power supply cable 4*a* and a control cable 4*b* are provided as motor lines 4. The external connection lines 6 consist for example of a mains cable 6*a* and a control cable 6*b*.

Figure 4:
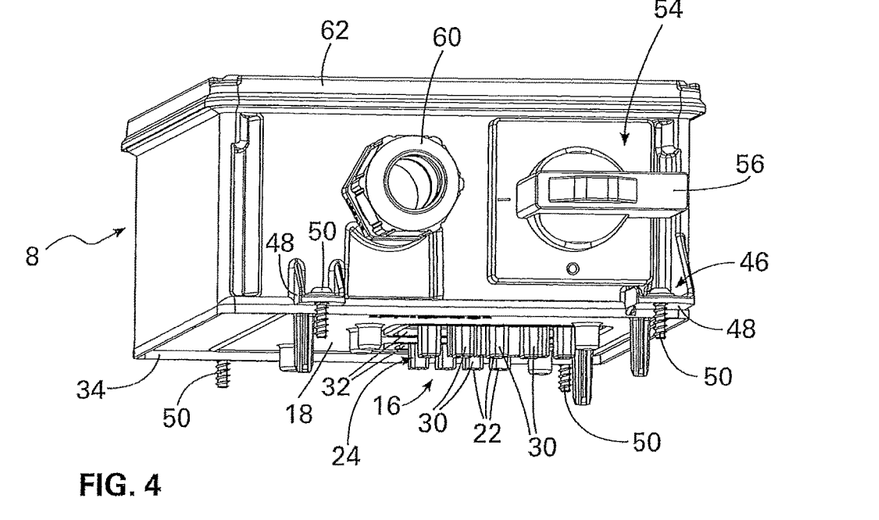
FIG. 4 is a separate perspective view of the terminal box alone.
Figure 6:
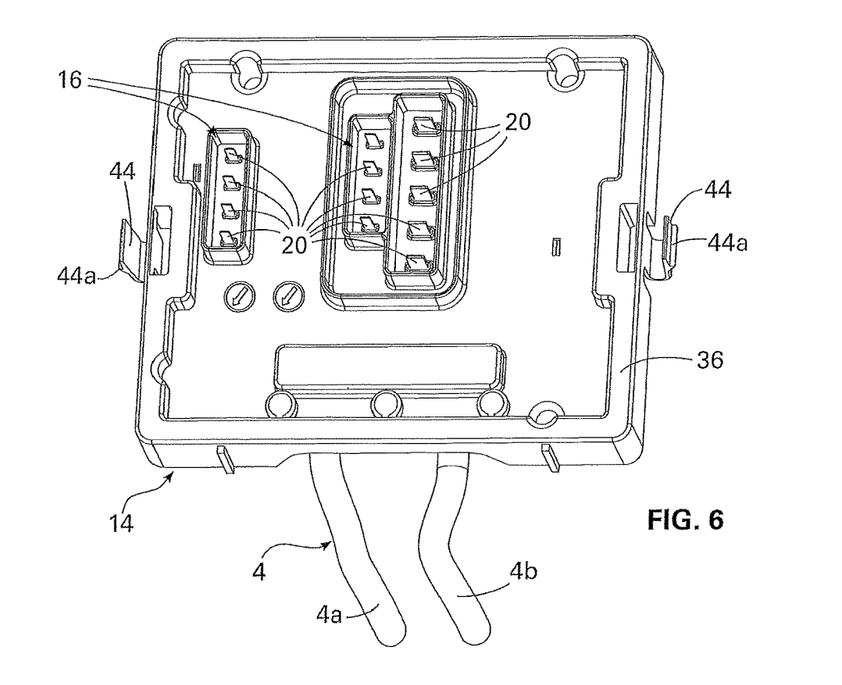
FIG. 6 is a separate perspective view of the additional connection part, towards the upper face thereof.
Figure 7:
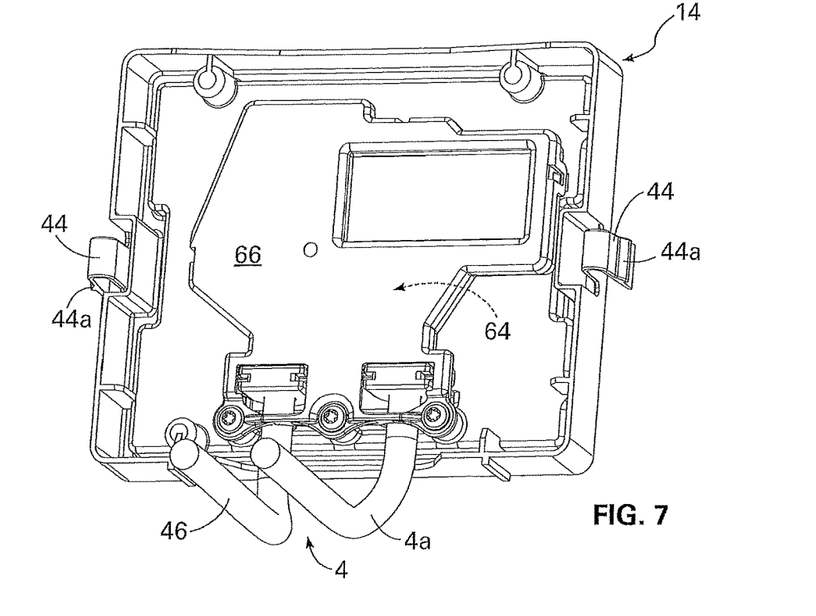
FIG. 7 is a further perspective view of the connection part, towards the lower face thereof.

According to the invention, the connection device 2 comprises an additional connection part 14, to which the motor lines 4 are connected in a fixed, in other words pre-fabricated, manner, particular contact elements 10 of the terminal box 8 being releasably, separably connected to the additional connection part 14 via electrical plug-in connections 16. The preferably plate-like connection part 14 is shown separately in FIGS. 6 and 7. In relation to the plug-in connections 16, reference is made in particular to FIGS. 2, 4 and 6.

In an advantageous configuration, the connection part 14 is releasably fixed in a region of the appliance part 12 covered by a base 18 of the terminal box 8. The connection part 12 (see FIGS. 6 and 7) and the base 18 of the terminal box 8 are preferably formed substantially congruent, with a similar, in particular rectangular, surface profile, and arranged mutually parallel in the mounted state. As a result, the base 18 of the terminal box 8 can be placed appropriately on the connection part 14. The connection part 14 comprises plug-in connector parts 20 (see FIGS. 2 and 6) directed upwards towards the terminal box 8, whilst in the region of the base thereof the terminal box 8 comprises corresponding plug-in connector parts 22 (see FIG. 4) directed downwards towards the connection part 14. The plug-in connector parts 20, 22 are arranged in such a way that when the terminal box 8 is mechanically placed on the region of the connection part 14 the plug-in connections are automatically plugged together and thus electrically connected.

Figure 9:
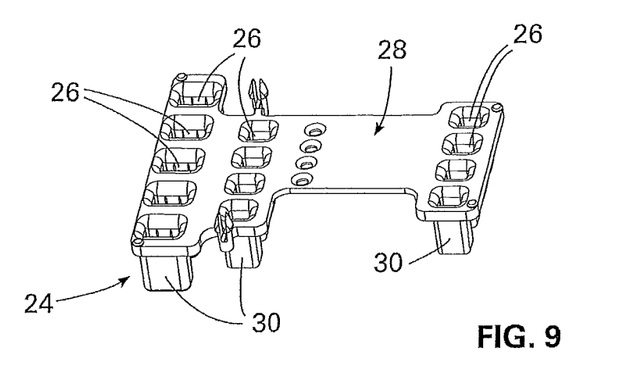
FIG. 9 is a perspective view of an insulation part for the plug-in connector parts of the terminal box.

In a further advantageous configuration, the plug-in connector parts 22 of the terminal box 8 comprise electrical contact protection insulation 24. In this regard, reference is made to FIGS. 4 and 9. Accordingly, the plug-in connector parts 22 are placed in receiving chambers 26 of an insulation part 28 arranged inside the terminal box 8. The insulation part 28 is shown separately in FIG. 9, the receiving chambers 26 not yet being equipped with the plug-in connector parts 22. As can be seen from FIG. 4, insulation portions 30 of the insulation part 28, which enclose the plug-in connector parts 22 in a sleeve-like manner, penetrate at least one base opening 32 of the terminal box 8 downwards towards the connection part 14. Since the plug-in connector parts 22 are completely enclosed by the insulation portions 30, reliable protection against contact with live components is ensured.

It is further advantageous for the terminal box 8 which covers the additional connection part 14 to be peripherally sealed at the edge to the connection part 14. For this purpose, the terminal box 8, in the outer region of the base 18 thereof, and the connection part 14, in the outer edge region, may comprise peripheral sealing rims 34, 36 (see in particular FIGS. 4 and 6). In addition, a resilient seal 38 (only shown in FIG. 5) may be provided in the region of the sealing rims 34, 36. As a result of this advantageous configuration, the plug-in connections 16 are enclosed by the sealing rims 34, 36 and thus protected against moisture and the like. As a result, simple plug-in connections, which are not themselves water-tight, may be used.

As can further be seen from FIGS. 1, 2, 3 and 5, the connection part 14 is positioned in a recess 40 of the appliance part 12 with a positive fit. The connection part 14 is preferably latched to the appliance part 12 and thus fixed against release. In the shown, preferred configuration, two diametrically opposed edge latch connections 42 are provided for this purpose. As can be seen in particular from FIGS. 6 and 7, for this purpose the connection part 14 comprises a U-shaped, bracket-like latch element 44 in each of two mutually opposed lateral edge regions, these latch elements 44 being resiliently movable laterally and each engaging by latching in a latch recess in the region of the recess 40 of the appliance part 22 by way of a tab-like latch projection 44*a*. The latch connections 42 are also releasable by moving the latch elements 44 inwards manually or by means of a suitable tool.

According to the invention, the terminal box 8, when placed on the connection part 14, is releasably fixed to the appliance part 12 via external screw connections 46, in other words ones accessible from the outside without opening the terminal box 8. As can be seen in particular from FIG. 2, for this purpose the terminal box 8 comprises, in side regions adjoining the base 18, laterally protruding holding projections 48 having holes for fastening screws 50, the fastening screws 50 penetrating the holes in the holding projections 48 and engaging in preferably pin-like projections 52 of the device part 12 alongside the recess 40.

According to the invention, the terminal box 8 additionally comprises an off switch 54 for switching off an external power supply, in particular the mains power. This is advantageously a three-pole switch, which interrupts all of the lines of the mains supply, in such a way that when it is switched off there is no longer power at the contact elements inside the terminal box 8 and in particular no longer power at the plug-in connection elements 2. According to an illustrated embodiment of the invention, the off switch 54 is in the form of a rotary switch, comprising a lever-like switching knob 56 in such a way that at least one of the external screw connections 46 is covered against the approach of a screwing tool in an on position and is only accessible for release in an off position. In this regard, reference is made in particular to FIG. 4, in which in the shown on position the lever-like switching knob 56 covers the screw connection 46, shown in the front right region, from above. As a result, the screw connection 46 cannot be released in the on position, but rather the off switch 54 first has to be rotated into the off position thereof. As a result, the switching knob 56 pivots upwards and exposes the screw connection 6 for the screwing tool.

A similar functionality is also achieved according to the invention if the off switch 54 is in the form of a sliding switch.

Figure 3:
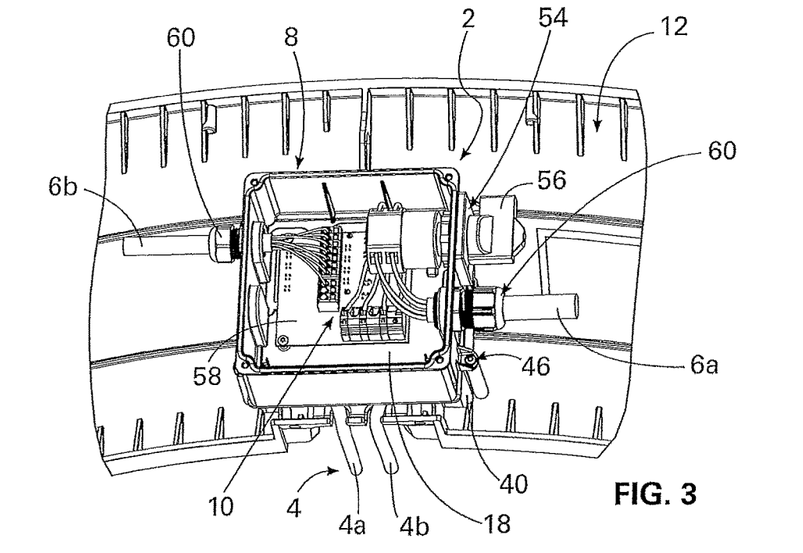
FIG. 3 is a view in the mounted state with the terminal box open.
Figure 8:
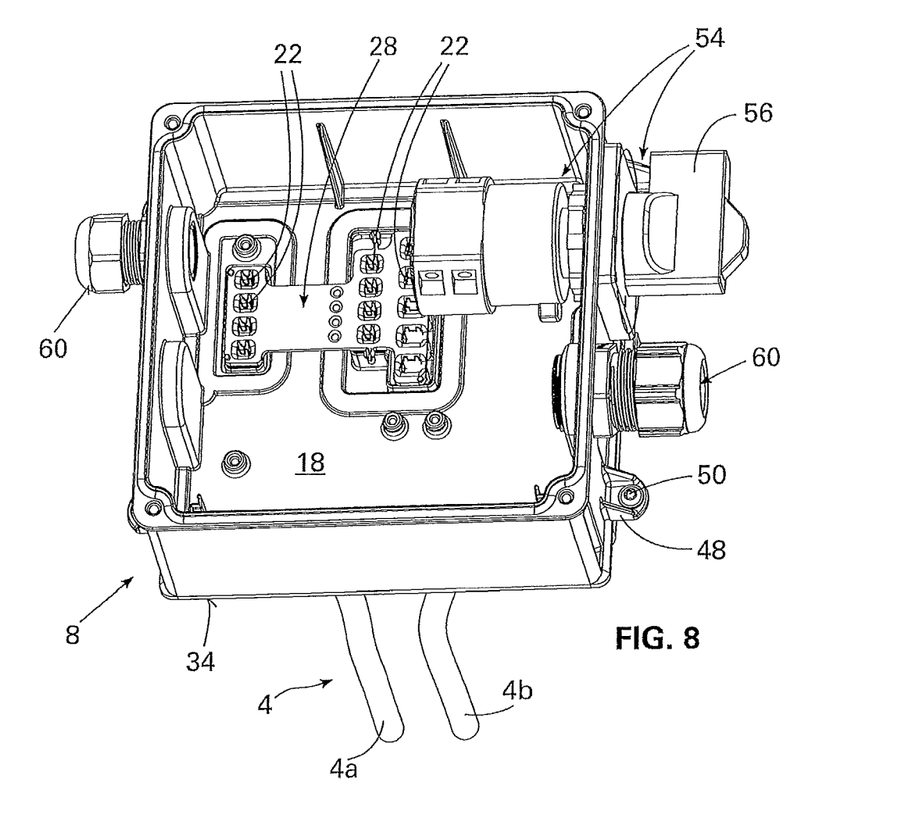
FIG. 8 is a perspective view into the open terminal box, omitting internal components.

As can further be seen from FIG. 3, a circuit board 58 is arranged inside the terminal box 8, on which board, on the one hand, contact elements 10 for connecting the external connection lines 6 indirectly via the off switch and, on the other hand, the plug-in connector parts 22 (cf. FIGS. 4 and 8) for the plug-in connection to the additional connection part 14 are arranged and electrically wired. The circuit board 58 is not shown in FIG. 8, so as to make it possible to view the insulating part 28 equipped with the plug-in connector parts 22. In this context, in the mounted state the circuit board 58 would cover the insulation part 28, the plug-in connector parts 22 being soldered to the circuit board.

It should further be noted that the external connection lines 6, in other words the mains cable 6a and the control cable 6b, are each introduced into the terminal box 8 through a cable sealing screw connection 60. The sealing screw connections 60 form sealed feed-throughs through side walls of the terminal box 8. Preferably, all of the lines 6 are electrically connected inside the terminal box 8 by way of plug-in terminals.

The terminal box 8 comprises an opening, which is tightly sealed using a releasable lid 62, on the upper face thereof facing away from the appliance part 14.

The motor lines 4, in other words preferably the supply cable 4a and the control cable 4b, are electrically connected to the plug-in connector parts 20 of the connection part 14 in an outwardly sealed connection space 64 of said connection part. The connection space 64 is shown in dashed lines in FIG. 7, and is tightly sealed at the underside, which faces away from the terminal box 8, by a cap-like cover 66.

As a result of the above-disclosed preferred configuration according to the invention, major simplifications are achieved in the manufacture and assembly as well as during maintenance work. For assembly, the connection part 14 according to the invention is fully pre-wired to the motor lines 4. For assembly, the connection part 14 is subsequently inserted and latched into the recess 40 of the appliance part 12. Subsequently, it merely remains to place the terminal box 8 on and fix it by way of the screw connections 46. The connection lines 6 are subsequently connected by the user in the conventional manner, in that the lid 62 is opened so as to be able to connect the lines which are introduced via the sealing screw connections 60. Finally, the cover 62 is closed.

If repair or replacement is to take place in the event of a fault, firstly the off switch 54 has to be switched to its off position in order to be able to release the corresponding screw connection 46 of the terminal box 8. After the screw connections 46 have been released, the terminal box 8 has merely to be taken of. For remounting, it is merely necessary to insert the connection part 14 into the recess 40 again and to place on and fix the terminal box 8 again.

The invention claimed is:

1. A ventilator comprising an electric ventilator motor and an electrical connection device for connecting electric motor lines, which lead to the motor, to external electrical connection lines, the connection device comprising a terminal box which is fixed to an appliance part of the ventilator and which contains electrical contact elements,
wherein
the terminal device comprises an additional connection part to which the motor lines are connected, the terminal box being releasably connected to the additional connection part via electrical plug-in connector parts,
the terminal box is releasably fixed to the appliance part via external screw connections,
the terminal box comprises an off switch for switching off an external power supply, the off switch being in the form of a rotary switch and comprising a lever-like switching knob, in such a way that at least one of the external screw connections is covered in an on position and accessible for release in an off position, or the off switch being configured as a sliding switch, in such a way that at least one of the external screw connections is covered in an on position and accessible for release in an off position;
and
a circuit board is accommodated inside the terminal box, the circuit board includes contact elements for electrically connecting the external connection lines and the circuit board includes the electrical plug-in connector parts for the electrical plug-in connection to the additional connection part.

2. The ventilator according to claim 1, wherein the connection part is releasably fixed in a region of the appliance part covered by a base of the terminal box, the connection part comprising plug-in connector parts directed towards the terminal box for electrically coupling with the circuit board plug-in connector parts.

3. The ventilator according to claim 2, wherein the plug-in connector parts of the terminal box comprise electrical contact protection insulation.

4. The ventilator according to claim 2, wherein the plug-in connector parts of the terminal box are positioned in receiving chambers of an insulation part arranged inside the terminal box, the insulation part with insulation portions which enclose the plug-in connector parts in a sleeve-like manner penetrating a base opening of the terminal box downwards towards the connection part.

5. The ventilator according to claim 2, wherein the motor lines, in particular a supply cable and a control cable, are connected to the plug-in connector parts of the connection part in an outwardly sealed connection space of said connection part.

6. The ventilator according to claim 1, wherein the terminal box is connected, in a manner peripherally sealed at an edge, to the connection part.

7. The ventilator according to claim 1, wherein the connection part is positioned in a recess of the appliance part and releasably fixed via in particular two mutually opposed edge latch connections.

8. The ventilator according to claim 1, wherein, the external connection lines, a main cable and a control cable are each introduced into the terminal box by way of a cable sealing screw connection.

9. The ventilator according to claim 1, wherein the terminal box comprises an opening, which can be tightly sealed using a releasable lid, on an upper face thereof facing away from the appliance part.

10. A ventilator comprising an electric ventilator motor and an electrical connection device for connecting electric motor lines, which lead to the motor, to external electrical connection lines, the connection device comprising a terminal box which is fixed to an appliance part of the ventilator and which contains electrical contact elements,
wherein
the terminal device comprises an additional connection part to which the motor lines are connected, the terminal box being releasably connected to the additional connection part via electrical plug-in connector parts,
the terminal box is releasably fixed to the appliance part via external screw connections, the terminal box comprises an off switch for switching off an external power supply, the off switch being in the form of a rotary switch and comprising a lever-like switching knob, in such a way that at least one of the external screw connections is covered in an on position and accessible for release in an off position, or the off switch being configured as a sliding switch, in such a way that at least one of the external screw connections is covered in an on position and accessible for release in an off position;
a circuit board is accommodated inside the terminal box, the circuit board includes contact elements for connecting the external connection lines and the circuit board includes the electrical plug-in connector parts for the electrical plug-in connection to the additional connection part; and
the connection part is releasably fixed in a region of the appliance part covered by a base of the terminal box, the connection part comprising plug-in connector parts directed towards the terminal box for electrically coupling with the circuit board plug-in connector parts.

\* \* \* \* \*